United States Patent
Xu et al.

(10) Patent No.: US 9,160,041 B2
(45) Date of Patent: Oct. 13, 2015

(54) BATTERY HEATING CIRCUITS AND METHODS USING RESONANCE COMPONENTS IN SERIES AND BRIDGING CHARGE STORAGE COMPONENTS

(75) Inventors: Wenhui Xu, Shenzhen (CN); Yaochuan Han, Shenzhen (CN); Wei Feng, Shenzhen (CN); Qinyao Yang, Shenzhen (CN); Wenjin Xia, Shenzhen (CN); Shibin Ma, Shenzhen (CN); Xianyin Li, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 433 days.

(21) Appl. No.: 13/486,883

(22) Filed: Jun. 1, 2012

(65) Prior Publication Data

US 2012/0280659 A1 Nov. 8, 2012

Related U.S. Application Data

(63) Continuation-in-part of application No. 13/185,744, filed on Jul. 19, 2011.

(51) Int. Cl.
*H02J 7/00* (2006.01)
*H01M 10/625* (2014.01)
*H01M 10/615* (2014.01)
(Continued)

(52) U.S. Cl.
CPC ....... *H01M 10/5016* (2013.01); *B60L 11/1875* (2013.01); *H01M 10/502* (2013.01); *H01M 10/5006* (2013.01); *H01M 10/5026* (2013.01);
(Continued)

(58) Field of Classification Search
CPC ............ H02J 7/00; H02J 320/144; H02J 7/04
USPC ........................................................ 320/129
See application file for complete search history.

(56) References Cited

U.S. PATENT DOCUMENTS

| 3,654,426 | A | 4/1972 | Brinkmann et al. |
| 3,808,481 | A | 4/1974 | Rippel |

(Continued)

FOREIGN PATENT DOCUMENTS

| CN | 1630129 A | 6/2005 |
| CN | 1630130 A | 6/2005 |

(Continued)

OTHER PUBLICATIONS

China Patent Office, Office Action dated Sep. 21, 2011, in related application CN 201010603658.3.

(Continued)

*Primary Examiner* — Thuan Do
(74) *Attorney, Agent, or Firm* — Jones Day

(57) ABSTRACT

According to certain embodiments, a battery heating circuit is provided, comprising a first switch unit 11, a second switch unit 12, a third switch unit 13, a fourth switch unit 14, a switching control module 100, a damping component R1, a current storage component L1, and a charge storage component C1; the damping component R1 and the current storage component L1 are configured to connect with the battery in series to form a branch; the first switch unit 11 and the second switch unit 12 are connected in series with each other and then connected in parallel with the branch; the third switch unit 13 and the fourth switch unit 14 are connected in series with each other and then connected in parallel with the branch.

13 Claims, 5 Drawing Sheets

(51) Int. Cl.
  *H01M 10/63*    (2014.01)
  *H01M 10/637*   (2014.01)
  *B60L 11/18*    (2006.01)
  *H02M 3/158*    (2006.01)

(52) U.S. Cl.
  CPC .............. *H02M 3/158* (2013.01); *Y02T 10/705* (2013.01); *Y02T 10/7005* (2013.01)

(56) References Cited

U.S. PATENT DOCUMENTS

| | | | |
|---|---|---|---|
| 4,171,508 | A | 10/1979 | Sinclair |
| 4,184,197 | A | 1/1980 | Cuk et al. |
| 4,222,000 | A | 9/1980 | Silvertown et al. |
| 5,362,942 | A | 11/1994 | Vanderslice, Jr. et al. |
| 5,396,165 | A | 3/1995 | Hwang et al. |
| 5,461,556 | A | 10/1995 | Horie et al. |
| 5,523,671 | A * | 6/1996 | Stewart .......... 320/152 |
| 5,561,597 | A | 10/1996 | Limpaecher |
| 5,768,114 | A | 6/1998 | Gruning et al. |
| 5,789,905 | A | 8/1998 | Yamasaki |
| 5,808,469 | A | 9/1998 | Kopera |
| 5,905,371 | A | 5/1999 | Limpaecher |
| 5,943,224 | A | 8/1999 | Mao |
| 5,948,298 | A | 9/1999 | Ijaz |
| 5,990,661 | A | 11/1999 | Ashtiani et al. |
| 6,002,240 | A | 12/1999 | McMahan et al. |
| 6,072,301 | A | 6/2000 | Ashtiani et al. |
| 6,078,163 | A | 6/2000 | Horie et al. |
| 6,211,652 | B1 | 4/2001 | Glasgow |
| 6,259,229 | B1 | 7/2001 | Ashtiani et al. |
| 6,340,879 | B1 | 1/2002 | Bläcker |
| 6,771,518 | B2 | 8/2004 | Orr et al. |
| 6,882,061 | B1 | 4/2005 | Ashtiani et al. |
| 7,292,010 | B2 | 11/2007 | Hsu et al. |
| 7,382,102 | B2 | 6/2008 | Ashtiani |
| 7,402,982 | B2 | 7/2008 | Ito et al. |
| 7,876,583 | B2 | 1/2011 | Polivka et al. |
| 8,004,866 | B2 | 8/2011 | Bucella et al. |
| 8,197,502 | B2 | 6/2012 | Smith et al. |
| 8,493,036 | B2 * | 7/2013 | Ferrario .......... 320/166 |
| 2005/0077879 | A1 | 4/2005 | Near |
| 2005/0156578 | A1 | 7/2005 | Kamenoff |
| 2005/0168195 | A1 | 8/2005 | MacDougall |
| 2005/0264237 | A1 | 12/2005 | Ishizuka |
| 2007/0024243 | A1 | 2/2007 | Liu et al. |
| 2007/0091023 | A1 | 4/2007 | Kosaka et al. |
| 2007/0121258 | A1 | 5/2007 | Hachiya |
| 2009/0014436 | A1 | 1/2009 | Toya et al. |
| 2009/0243547 | A1 | 10/2009 | Andelfinger |
| 2011/0095711 | A1 | 4/2011 | Hsieh et al. |
| 2011/0144861 | A1 | 6/2011 | Lakirovich et al. |
| 2011/0273136 | A1 | 11/2011 | Yoshimoto |
| 2012/0024838 | A1 | 2/2012 | Xu et al. |
| 2012/0025754 | A1 | 2/2012 | Xu et al. |
| 2012/0025755 | A1 | 2/2012 | Xu et al. |
| 2012/0025756 | A1 | 2/2012 | Xu et al. |
| 2012/0025772 | A1 | 2/2012 | Xu et al. |
| 2012/0025774 | A1 | 2/2012 | Xu et al. |
| 2012/0025775 | A1 | 2/2012 | Xu et al. |
| 2012/0025776 | A1 | 2/2012 | Xu et al. |
| 2012/0025777 | A1 | 2/2012 | Xu et al. |
| 2012/0025778 | A1 | 2/2012 | Xu et al. |
| 2012/0025779 | A1 | 2/2012 | Xu et al. |
| 2012/0025780 | A1 | 2/2012 | Xu et al. |
| 2012/0025781 | A1 | 2/2012 | Xu et al. |
| 2012/0025782 | A1 | 2/2012 | Xu et al. |
| 2012/0025783 | A1 | 2/2012 | Xu et al. |
| 2012/0031890 | A1 | 2/2012 | Han et al. |
| 2012/0032642 | A1 | 2/2012 | Xu et al. |
| 2012/0126753 | A1 | 5/2012 | Carkner |
| 2012/0161711 | A1 | 6/2012 | Xu et al. |
| 2012/0279951 | A1 | 11/2012 | Xu et al. |
| 2012/0280658 | A1 | 11/2012 | Xu et al. |
| 2012/0299551 | A1 | 11/2012 | Xu et al. |
| 2012/0306432 | A1 | 12/2012 | Xu et al. |
| 2013/0127398 | A1 | 5/2013 | Xu et al. |
| 2013/0134146 | A1 | 5/2013 | Han et al. |
| 2013/0134945 | A1 | 5/2013 | Xu et al. |
| 2013/0141032 | A1 | 6/2013 | Xu et al. |

FOREIGN PATENT DOCUMENTS

| | | |
|---|---|---|
| CN | 1809942 A | 7/2006 |
| CN | 1836356 A | 9/2006 |
| CN | 1291518 C | 12/2006 |
| CN | 101552479 A | 10/2009 |
| CN | 201397868 Y | 2/2010 |
| CN | 101685971 A | 3/2010 |
| CN | 201435426 Y | 3/2010 |
| CN | 201667552 U | 12/2010 |
| CN | 102055042 A | 5/2011 |
| CN | 102074756 A | 5/2011 |
| CN | 201936966 U | 8/2011 |
| CN | 201936967 U | 8/2011 |
| CN | 201936969 U | 8/2011 |
| CN | 201966300 U | 9/2011 |
| CN | 202009059 U | 10/2011 |
| CN | 202042567 U | 11/2011 |
| CN | 202076380 U | 12/2011 |
| CN | 202103139 U | 1/2012 |
| CN | 202121024 U | 1/2012 |
| CN | 102074755 B | 5/2012 |
| CN | 102074758 B | 6/2012 |
| CN | 102074759 B | 6/2012 |
| CN | 102074753 B | 7/2012 |
| CN | 102074756 B | 7/2012 |
| CN | 102074760 B | 7/2012 |
| CN | 102074762 B | 7/2012 |
| CN | 102074761 B | 9/2012 |
| CN | 102088117 B | 9/2012 |
| CN | 102082306 B | 11/2012 |
| CN | 102088116 B | 11/2012 |
| EP | 0 418 919 A2 | 3/1991 |
| EP | 1 930 922 A2 | 6/2008 |
| JP | 4-12472 A | 1/1992 |
| JP | 5022876 A | 1/1993 |
| JP | 2007-166779 A | 6/2007 |
| JP | 4016045 B2 | 12/2007 |
| SU | 813544 B | 3/1981 |
| TW | 220014 B | 2/1994 |
| TW | 269727 B | 2/1996 |
| TW | 344721 B | 11/1998 |
| TW | 200518370 A | 6/2005 |
| TW | 200527793 A | 8/2005 |
| TW | M275625 U | 9/2005 |
| WO | WO 2010/145439 A1 | 12/2010 |

OTHER PUBLICATIONS

China Patent Office, Office Action dated Jul. 27, 2011, in related application CN 201010603717.7.
China Patent Office, Office Action dated Jul. 27, 2011, in related application CN 201010604714.5.
China Patent Office, Office Action dated Sep. 5, 2011, in related application CN 201010606082.6.
China Patent Office, Office Action dated Sep. 21, 2011, in related application CN 201010605772.X.
China Patent Office, Office Action dated Feb. 2, 2012, in related application CN 201010604777.0.
China Patent Office, Office Action dated Sep. 2, 2011, in related application CN 201010604777.0.
China Patent Office, Office Action dated Jan. 9, 2012, in related application CN 201010604729.1.
China Patent Office, Office Action dated Jul. 18, 2011, in related application CN 201010604729.1.
China Patent Office, Office Action dated Dec. 28, 2011, in related application CN 201010603719.6.
China Patent Office, Office Action dated Jul. 28, 2011, in related application CN 201010603719.6.
China Patent Office, Office Action dated Jan. 5, 2012, in related application CN 201010603471.3.

(56) References Cited

OTHER PUBLICATIONS

China Patent Office, Office Action dated Jul. 15, 2011, in related application CN 201010603471.3.
China Patent Office, Office Action dated Jul. 27, 2011, in related application CN 201010603414.5.
China Patent Office, Office Action dated Nov. 16, 2011, in related application CN 201010603414.5.
China Patent Office, Office Action dated Aug. 1, 2011, in related application CN 201010603669.1.
China Patent Office, Office Action dated Sep. 15, 2011, in related application CN 201010604677.8.
China Patent Office, Office Action dated Feb. 2, 2012, in related application CN 201010604744.6.
China Patent Office, Office Action dated Sep. 20, 2011, in related application CN 201010604744.6.
China Patent Office, Office Action dated Oct. 25, 2011, in related application CN 201110080853.7.
China Patent Office, Office Action dated Nov. 1, 2011, in related application CN 201110081219.5.
China Patent Office, Office Action dated Jan. 21, 2012, in related application CN 201110081276.3.
China Patent Office, Office Action dated Jun. 5, 2012, in related application CN 201110081276.3.
China Patent Office, Office Action dated May 16, 2012, in related application CN 201110137264.8.
China Patent Office, Office Action dated Jan. 21, 2012, in related application CN 201110132362.2.
China Patent Office, Office Action dated Jan. 21, 2012, in related application CN 201110134005.X.
China Patent Office, Office Action dated May 2, 2012, in related application CN 201110134005.X.
European Patent Office, Extended European Search Report dated Sep. 13, 2011, in related application EP 11166955.2.
European Patent Office, Extended European Search Report dated Nov. 30, 2011, in related application EP 11166938.8.
European Patent Office, Extended European Search Report dated Dec. 15, 2011, in related application EP 11166941.2.
European Patent Office, Extended European Search Report dated Sep. 16, 2011, in related application EP 11166949.5.
European Patent Office, Extended European Search Report dated Oct. 6, 2011, in related application EP 11166925.5.
European Patent Office, European Search Report dated Sep. 29, 2011, in related application EP 11166958.6.
European Patent Office, Extended European Search Report dated Jan. 25, 2012, in related application EP 11166952.9.
European Patent Office, European Search Report dated Sep. 21, 2011, in related application EP 11166969.3.
European Patent Office, European Search Report dated Sep. 1, 2011, in related application EP 11166903.2.
European Patent Office, Extended European Search Report dated Nov. 8, 2011, in related application EP 11166872.9.
European Patent Office, Extended European Search Report dated Nov. 25, 2011, in related application EP 11166882.8.
European Patent Office, Extended European Search Report dated Nov. 25, 2011, in related application EP 11166897.6.
European Patent Office, Extended European Search Report dated Sep. 6, 2011, in related application EP 11166900.8.
European Patent Office, Extended European Search Report dated Sep. 23, 2011, in related application EP 11166914.9.
European Patent Office, Extended European Search Report dated Nov. 8, 2011, in related application EP 11166920.6.
European Patent Office, Extended European Search Report dated Sep. 27, 2011, in related application EP 11167066.7.
European Patent Office, Extended European Search Report dated Sep. 8, 2011, in related application EP 11166902.4.
European Patent Office, Extended European Search Report dated Oct. 6, 2011, in related application EP 11167128.5.
Patent Cooperation Treaty, International Search Report and Written Opinion, dated Sep. 1, 2011, in related application PCT/CN2011/074449.
Patent Cooperation Treaty, International Search Report and Written Opinion, dated Aug. 18, 2011, in related application PCT/CN2011/074453.
Patent Cooperation Treaty, International Search Report and Written Opinion, dated Aug. 11, 2011, in related application PCT/CN2011/074463.
Patent Cooperation Treaty, International Search Report and Written Opinion, dated Aug. 25, 2011, in related application PCT/CN2011/074458.
Patent Cooperation Treaty, International Search Report and Written Opinion, dated Aug. 11, 2011, in related application PCT/CN2011/074462.
Patent Cooperation Treaty, International Search Report and Written Opinion, dated Aug. 11, 2011, in related application PCT/CN2011/074457.
Patent Cooperation Treaty, International Search Report and Written Opinion, dated Aug. 25, 2011, in related application PCT/CN2011/074459.
Patent Cooperation Treaty, International Search Report and Written Opinion, dated Aug. 18, 2011, in related application PCT/CN2011/074456.
Patent Cooperation Treaty, International Search Report and Written Opinion, dated Aug. 18, 2011, in related application PCT/CN2011/074460.
Patent Cooperation Treaty, International Search Report and Written Opinion, dated Aug. 11, 2011, in related application PCT/CN2011/074433.
Patent Cooperation Treaty, International Search Report and Written Opinion, dated Aug. 18, 2011, in related application PCT/CN2011/074436.
Patent Cooperation Treaty, International Search Report and Written Opinion, dated Aug. 25, 2011, in related application PCT/CN2011/074438.
Patent Cooperation Treaty, International Search Report and Written Opinion, dated Aug. 11, 2011, in related application PCT/CN2011/074440.
Patent Cooperation Treaty, International Search Report and Written Opinion, dated Aug. 25, 2011, in related application PCT/CN2011/074455.
Patent Cooperation Treaty, International Search Report and Written Opinion, dated Aug. 11, 2011, in related application PCT/CN2011/074461.
Patent Cooperation Treaty, International Search Report and Written Opinion, dated Sep. 1, 2011, in related application PCT/CN2011/074531.
Patent Cooperation Treaty, International Search Report and Written Opinion, dated Aug. 18, 2011, in related application PCT/CN2011/074442.
Patent Cooperation Treaty, International Search Report and Written Opinion, dated Jul. 21, 2011, in related application PCT/CN2011/074536.
United States Patent and Trademark Office, Office Action mailed Jul. 16, 2013, in related U.S. Appl. No. 13/166,281.
United States Patent and Trademark Office, Office Action mailed May 31, 2013, in related U.S. Appl. No. 13/168,004.
United States Patent and Trademark Office, Office Action mailed May 22, 2013, in related U.S. Appl. No. 13/168,014.
United States Patent and Trademark Office, Office Action mailed Jul. 5, 2013, in related U.S. Appl. No. 13/170,021.
United States Patent and Trademark Office, Office Action mailed Jul. 30, 2013, in related U.S. Appl. No. 13/166,301.
United States Patent and Trademark Office, Office Action mailed Sep. 5, 2013, in related U.S. Appl. No. 13/189,096.
United States Patent and Trademark Office, Office Action mailed Aug. 29, 2013, in related U.S. Appl. No. 13/187,874.
United States Patent and Trademark Office, Office Action mailed Aug. 29, 2013, in related U.S. Appl. No. 13/189,114.
United States Patent and Trademark Office, Office Action mailed Sep. 30, 2013, in related U.S. Appl. No. 13/170,044.
United States Patent and Trademark Office, Office Action mailed Jun. 19, 2013, in related U.S. Appl. No. 13/187,890.
Taiwan Intellectual Property Office, Office Action dated Jan. 10, 2014, in related application TW 100143128.

(56) References Cited

OTHER PUBLICATIONS

Taiwan Intellectual Property Office, Office Action dated Jan. 10, 2014, in related application TW 100143130.
Taiwan Intellectual Property Office, Office Action dated Jan. 10, 2014, in related application TW 100143133.
Taiwan Intellectual Property Office, Office Action dated Jan. 7, 2014, in related application TW 100140587.
Taiwan Intellectual Property Office, Office Action dated Jan. 6, 2014, in related application TW 100140588.
Taiwan Intellectual Property Office, Office Action dated Feb. 17, 2014, in related application TW 100143160.
Taiwan Intellectual Property Office, Office Action dated Jan. 6, 2014, in related application TW 100140590.
Taiwan Intellectual Property Office, Office Action dated Jan. 17, 2014, in related application TW 100141797.
Taiwan Intellectual Property Office, Office Action dated Jan. 17, 2014, in related application TW 100141802.
United States Patent and Trademark Office, Notice of Allowance mailed Dec. 5, 2013, in related U.S. Appl. No. 13/166,281.
United States Patent and Trademark Office, Notice of Allowance mailed Nov. 8, 2013, in related U.S. Appl. No. 13/166,301.
United States Patent and Trademark Office, Notice of Allowance mailed Jan. 6, 2014, in related U.S. Appl. No. 13/189,096.
United States Patent and Trademark Office, Notice of Allowance mailed Jan. 6, 2014, in related U.S. Appl. No. 13/187,874.
United States Patent and Trademark Office, Office Action mailed Nov. 20, 2013, in related U.S. Appl. No. 13/168,004.
United States Patent and Trademark Office, Office Action mailed Nov. 22, 2013, in related U.S. Appl. No. 13/168,014.
United States Patent and Trademark Office, Final Office Action mailed Feb. 25, 2014, in related U.S. Appl. No. 13/170,021.
United States Patent and Trademark Office, Office Action mailed Jan. 6, 2014, in related U.S. Appl. No. 13/187,266.
United States Patent and Trademark Office, Office Action mailed Jan. 3, 2014, in related U.S. Appl. No. 13/184,906.
United States Patent and Trademark Office, Office Action mailed Jan. 2, 2014, in related U.S. Appl. No. 13/189,114.
United States Patent and Trademark Office, Office Action mailed Dec. 3, 2013, in related U.S. Appl. No. 13/187,279.
United States Patent and Trademark Office, Office Action mailed Dec. 4, 2013, in related U.S. Appl. No. 13/187,890.
United States Patent and Trademark Office, Office Action mailed Jan. 6, 2014, in related U.S. Appl. No. 13/541,487.
United States Patent and Trademark Office, Office Action mailed Dec. 4, 2013, in related U.S. Appl. No. 13/748,525.
United States Patent and Trademark Office, Office Action mailed Jan. 15, 2014, in related U.S. Appl. No. 13/749,480.
United States Patent and Trademark Office, Office Action mailed Jun. 10, 2014, in related U.S. Appl. No. 13/168,004.
United States Patent and Trademark Office, Office Action mailed Jun. 18, 2014, in related U.S. Appl. No. 13/168,014.
United States Patent and Trademark Office, Office Action mailed Jun. 16, 2014, in related U.S. Appl. No. 13/184,879.
United States Patent and Trademark Office, Office Action mailed Jun. 20, 2014, in related U.S. Appl. No. 13/184,894.
United States Patent and Trademark Office, Office Action mailed Jun. 25, 2014, in related U.S. Appl. No. 13/187,266.
United States Patent and Trademark Office, Office Action mailed Jun. 24, 2014, in related U.S. Appl. No. 13/184,906.
United States Patent and Trademark Office, Office Action mailed Jun. 17, 2014, in related U.S. Appl. No. 13/185,744.
United States Patent and Trademark Office, Office Action mailed Jun. 16, 2014, in related U.S. Appl. No. 13/184,915.
United States Patent and Trademark Office, Office Action mailed Jun. 24, 2014, in related U.S. Appl. No. 13/187,279.
United States Patent and Trademark Office, Office Action mailed Jun. 13, 2014, in related U.S. Appl. No. 13/185,756.
United States Patent and Trademark Office, Office Action mailed Jul. 7, 2014, in related U.S. Appl. No. 13/187,890.
United States Patent and Trademark Office, Office Action mailed Jun. 25, 2014, in related U.S. Appl. No. 13/541,487.
United States Patent and Trademark Office, Office Action mailed Jun. 26, 2014, in related U.S. Appl. No. 13/748,525.
United States Patent and Trademark Office, Office Action mailed Jun. 24, 2014, in related U.S. Appl. No. 13/749,480.
United States Patent and Trademark Office, Notice of Allowance mailed Apr. 25, 2014, in related U.S. Appl. No. 13/166,281.
United States Patent and Trademark Office, Notice of Allowance mailed Jun. 24, 2014, in related U.S. Appl. No. 13/170,021.
United States Patent and Trademark Office, Notice of Allowance mailed May 2, 2014, in related U.S. Appl. No. 13/166,301.
United States Patent and Trademark Office, Notice of Allowance mailed Jun. 18, 2014, in related U.S. Appl. No. 13/189,096.
United States Patent and Trademark Office, Notice of Allowance mailed May 8, 2014, in related U.S. Appl. No. 13/187,874.
United States Patent and Trademark Office, Notice of Allowance mailed Apr. 28, 2014, in related U.S. Appl. No. 13/189,114.
United States Patent and Trademark Office, Notice of Allowance mailed May 22, 2014, in related U.S. Appl. No. 13/170,044.
United States Patent and Trademark Office, Office Action mailed Sep. 26, 2014, in related U.S. Appl. No. 13/544,881.
United States Patent and Trademark Office, Office Action mailed Sep. 11, 2014, in related U.S. Appl. No. 13/465,906.
United States Patent and Trademark Office, Office Action mailed Sep. 11, 2014, in related U.S. Appl. No. 13/545,885.
United States Patent and Trademark Office, Notice of Allowance mailed Oct. 6, 2014, in related U.S. Appl. No. 13/168,014.
United States Patent and Trademark Office, Notice of Allowance mailed Oct. 6, 2014, in related U.S. Appl. No. 13/184,906.
United States Patent and Trademark Office, Notice of Allowance mailed Oct. 6, 2014, in related U.S. Appl. No. 13/187,279.
United States Patent and Trademark Office, Notice of Allowance mailed Oct. 3, 2014, in related U.S. Appl. No. 13/187,890.
United States Patent and Trademark Office, Notice of Allowance mailed Oct. 7, 2014, in related U.S. Appl. No. 13/541,487.
United States Patent and Trademark Office, Notice of Allowance mailed Oct. 6, 2014, in related U.S. Appl. No. 13/748,525.
United States Patent and Trademark Office, Notice of Allowance mailed Oct. 6, 2014, in related U.S. Appl. No. 13/749,480.
United States Patent and Trademark Office, Office Action mailed Nov. 13, 2014, in related U.S. Appl. No. 13/168,004.
United States Patent and Trademark Office, Office Action mailed Nov. 17, 2014, in related U.S. Appl. No. 13/187,266.
United States Patent and Trademark Office, Office Action mailed Dec. 11, 2014, in related U.S. Appl. No. 13/184,879.
United States Patent and Trademark Office, Office Action mailed Dec. 24, 2014, in related U.S. Appl. No. 13/184,894.
United States Patent and Trademark Office, Office Action mailed Dec. 31, 2014, in related U.S. Appl. No. 13/185,744.
United States Patent and Trademark Office, Office Action mailed Jan. 13, 2015, in related U.S. Appl. No. 13/184,915.
United States Patent and Trademark Office, Office Action mailed Dec. 31, 2014, in related U.S. Appl. No. 13/185,756.
United States Patent and Trademark Office, Corrected Notice of Allowability mailed May 13, 2015, in related U.S. Appl. No. 13/168,004.
United States Patent and Trademark Office, Corrected Notice of Allowability mailed May 20, 2015, in related U.S. Appl. No. 13/184,894.
United States Patent and Trademark Office, Corrected Notice of Allowability mailed May 21, 2015, in related U.S. Appl. No. 13/184,915.
United States Patent and Trademark Office, Supplemental Notice of Allowability mailed May 20, 2015, in related U.S. Appl. No. 13/544,881.
United States Patent and Trademark Office, Supplemental Notice of Allowability mailed May 13, 2015, in related U.S. Appl. No. 13/747,378.
United States Patent and Trademark Office, Notice of Allowance mailed May 20, 2015, in related U.S. Appl. No. 13/465,906.
United States Patent and Trademark Office, Office Action mailed Mar. 25, 2015, in related U.S. Appl. No. 13/187,266.

(56) References Cited

OTHER PUBLICATIONS

United States Patent and Trademark Office, Office Action mailed Apr. 1, 2015, in related U.S. Appl. No. 13/747,387.
United States Patent and Trademark Office, Office Action mailed Feb. 13, 2015, in related U.S. Appl. No. 13/465,906.
United States Patent and Trademark Office, Office Action mailed Apr. 13, 2015, in related U.S. Appl. No. 13/545,885.
United States Patent and Trademark Office, Notice of Allowance mailed Feb. 18, 2015, in related U.S. Appl. No. 13/168,004.
United States Patent and Trademark Office, Corrected Notice of Allowability mailed Apr. 3, 2015, in related U.S. Appl. No. 13/168,004.
United States Patent and Trademark Office, Notice of Allowance mailed Mar. 18, 2015, in related U.S. Appl. No. 13/184,879.
United States Patent and Trademark Office, Notice of Allowance mailed Mar. 27, 2015, in related U.S. Appl. No. 13/184,894.
United States Patent and Trademark Office, Notice of Allowance mailed Mar. 23, 2015, in related U.S. Appl. No. 13/185,744.
United States Patent and Trademark Office, Notice of Allowance mailed Mar. 30, 2015, in related U.S. Appl. No. 13/184,915.
United States Patent and Trademark Office, Corrected Notice of Allowability mailed Feb. 11, 2015, in related U.S. Appl. No. 13/187,279.
United States Patent and Trademark Office, Notice of Allowance mailed Apr. 29, 2015, in related U.S. Appl. No. 13/185,756.
United States Patent and Trademark Office, Notice of Allowance mailed Mar. 3, 2015, in related U.S. Appl. No. 13/544,881.
United States Patent and Trademark Office, Supplemental Notice of Allowability mailed Mar. 17, 2015, in related U.S. Appl. No. 13/544,881.
United States Patent and Trademark Office, Notice of Allowance mailed Mar. 27, 2015, in related U.S. Appl. No. 13/747,378.
United States Patent and Trademark Office, Notice of Allowance mailed Mar. 18, 2015, in related U.S. Appl. No. 13/486,883.
United States Patent and Trademark Office, Corrected Notice of Allowability mailed Feb. 23, 2015, in related U.S. Appl. No. 13/748,525.

* cited by examiner

BATTERY HEATING CIRCUITS AND METHODS USING RESONANCE COMPONENTS IN SERIES AND BRIDGING CHARGE STORAGE COMPONENTS

1. CROSS-REFERENCE TO RELATED APPLICATIONS

This application is continuation-in-part of U.S. patent application Ser. No. 13/185,744, which claims priority to Chinese Patent Application No. 201010245288.0, filed Jul. 30, 2010, Chinese Patent Application No. 201010274785.3, filed Aug. 30, 2010, and Chinese Patent Application No. 201110081219.5, filed Mar. 31, 2011, all these four applications being incorporated by reference herein for all purposes.

Additionally, this application is related to International Application Publication No. WO2010/145439A1 and Chinese Application Publication No. CN102055042A, both these two applications being incorporated by reference herein for all purposes.

2. BACKGROUND OF THE INVENTION

The present invention pertains to electric and electronic field, in particular related to a battery heating circuit.

Considering cars need to run under complex road conditions and environmental conditions or some electronic devices are used under harsh environmental conditions, the battery, which serves as the power supply unit for electric-motor cars or electronic devices, need to be adaptive to these complex conditions. In addition, besides these conditions, the service life and charge/discharge cycle performance of the battery need to be taken into consideration; especially, when electric-motor cars or electronic devices are used in low temperature environments, the battery needs to have outstanding low-temperature charge/discharge performance and higher input/output power performance.

Usually, under low temperature conditions, the resistance of the battery will increase, and so will the polarization; therefore, the capacity of the battery will be reduced.

To keep the capacity of the battery and improve the charge/discharge performance of the battery under low temperature conditions, some embodiments of the present invention provide a battery heating circuit.

3. BRIEF SUMMARY OF THE INVENTION

The objective of certain embodiments of the present invention is to provide a battery heating circuit, in order to solve the problem of decreased capacity of the battery caused by increased resistance and polarization of the battery under low temperature conditions.

According to one embodiment, a battery heating circuit is provided, comprising a first switch unit 11, a second switch unit 12, a third switch unit 13, a fourth switch unit 14, a switching control module 100, a damping component R1, a current storage component L1, and a charge storage component C1; the damping component R1 and the current storage component L1 are configured to connect with the battery in series to form a branch; the first switch unit 11 and the second switch unit 12 are connected in series with each other and then connected in parallel with the branch; the third switch unit 13 and the fourth switch unit 14 are connected in series with each other and then connected in parallel with the branch; the charge storage component C1 is connected in series between the junction point of the first switch unit 11 and the second switch unit 12 and the junction point of the third switch unit 13 and fourth switch unit 14, so that the first switch unit 11, the charge storage component C1, and the third switch unit 13 form a first branch configured to transfer energy from the battery to the charge storage component C1 and a second branch configured to transfer energy from the charge storage component C1 to the battery, and the fourth switch unit 14, the charge storage component C1, and the second switch unit 12 form a third branch configured to transfer energy from the battery to the charge storage component C1 and a fourth branch configured to transfer energy from the charge storage component C1 to the battery; the switching control module 100 is connected with the first switch unit 11, the second switch unit 12, the third switch unit 13, and the fourth switch unit 14 respectively, and is configured to control ON/OFF of the first switch unit 11, the second switch unit 12, the third switch unit 13, and the fourth switch unit 14, so as to control the energy flow between the battery and the charge storage component C1.

The heating circuit provided in certain embodiments of the present invention can improve the charge/discharge performance of the battery; in addition, safety problem caused by short circuit can be avoided when the battery is heated due to the existence of the charge storage component connected in series, and therefore the battery can be protected effectively according to some embodiments.

Other characteristics and advantages of the present invention will be further described in detail in the following section for embodiments.

4. BRIEF DESCRIPTION OF THE DRAWINGS

The accompanying drawings, as a part of this description, are provided here to facilitate further understanding of the present invention, and are used in conjunction with the following embodiments to explain the present invention, but shall not be comprehended as constituting any limitation on the present invention. In the figures.

5. DETAILED DESCRIPTION OF THE INVENTION

Figure 1:
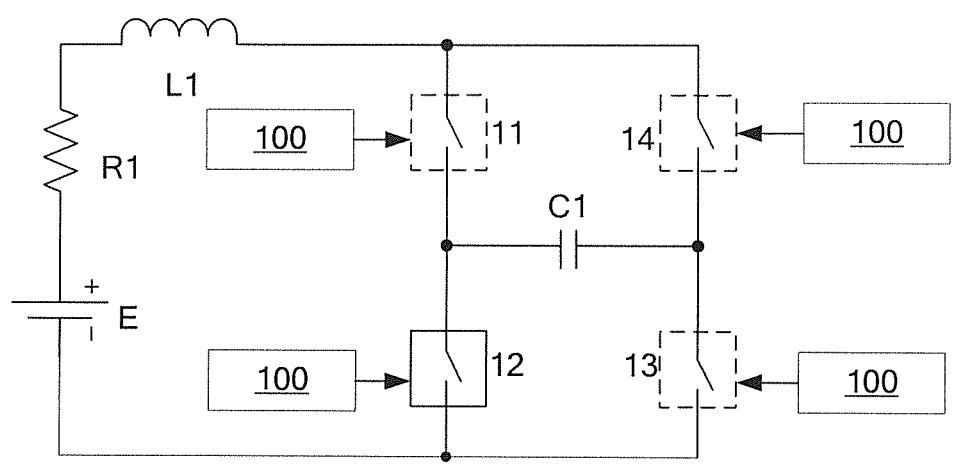
FIG. 1 is a schematic diagram showing a battery heating circuit according to one embodiment of the present invention.

Certain embodiments of the present invention are described in detail below, with reference to the accompanying drawings. It should be appreciated that the embodiments described here are only provided to describe and explain the present invention, but shall not be deemed as constituting any limitation on the present invention.

It is noted that, unless otherwise specified, when mentioned hereafter in this description, the term "switching control module" may refer to any controller that can output control commands (e.g., pulse waveforms) under preset conditions or at preset times and thereby control the switch unit connected to it to switch on or switch off accordingly, according to some embodiments. For example, the switching control module can be a PLC. Unless otherwise specified, when mentioned hereafter in this description, the term "switch" may refer to a switch that enables ON/OFF control by using electrical signals or enables ON/OFF control on the basis of the characteristics of the component according to certain embodiments. For example, the switch can be either a one-way switch (e.g., a switch composed of a two-way switch and a diode connected in series, which can be conductive in one direction) or a two-way switch (e.g., a Metal Oxide Semiconductor Field Effect Transistor (MOSFET) or an IGBT with an anti-parallel freewheeling diode). Unless otherwise specified, when mentioned hereafter in this description, the term "two-way switch" may refer to a switch that can be conductive in two directions, which can enable ON/OFF control by using electrical signals or enable ON/OFF control on the basis of the characteristics of the component according to some embodiments. For example, the two-way switch can be a MOSFET or an IGBT with an anti-parallel freewheeling diode. Unless otherwise specified, when mentioned hereafter in this description, the term "one-way semiconductor component" may refer to a semiconductor component that can be conductive in one direction, such as a diode, according to certain embodiments. Unless otherwise specified, when mentioned hereafter in this description, the term "charge storage component" may refer to any device that can enable charge storage, such as a capacitor, according to some embodiments. Unless otherwise specified, when mentioned hereafter in this description, the term "current storage component" may refer to any device that can store current, such as an inductor, according to certain embodiments. Unless otherwise specified, when mentioned hereafter in this description, the term "forward direction" may refer to the direction in which the energy flows from the battery to the energy storage circuit, and the term "reverse direction" may refer to the direction in which the energy flows from the energy storage circuit to the battery, according to some embodiments. Unless otherwise specified, when mentioned hereafter in this description, the term "battery" may comprise primary battery (e.g., dry battery or alkaline battery, etc.) and secondary battery (e.g., lithium-ion battery, nickel-cadmium battery, nickel-hydrogen battery, or lead-acid battery, etc.), according to certain embodiments. Unless otherwise specified, when mentioned hereafter in this description, the term "damping component" may refer to any device that inhibits current flow and thereby enables energy consumption, such as a resistor, etc., according to some embodiments. Unless otherwise specified, when mentioned hereafter in this description, the term "main loop" may refer to a loop composed of battery, damping component, switch unit and energy storage circuit connected in series according to certain embodiments.

It should be noted specially that, considering different types of batteries have different characteristics, in some embodiments of the present invention, "battery" may refer to an ideal battery that does not have internal parasitic resistance and parasitic inductance or has very low internal parasitic resistance and parasitic inductance, or may refer to a battery pack that has internal parasitic resistance and parasitic inductance; therefore, those skilled in the art should appreciate that if the battery is an ideal battery that does not have internal parasitic resistance and parasitic inductance or has very low internal parasitic resistance and parasitic inductance, the damping component R1 may refer to a damping component external to the battery and the current storage component L1 may refer to a current storage component external to the battery; if the battery is a battery pack that has internal parasitic resistance and parasitic inductance, the damping component R1 may refer to a damping component external to the battery or refer to the parasitic resistance in the battery pack, and the current storage component L1 may refer to a current storage component external to the battery or refer to the parasitic inductance in the battery pack, according to certain embodiments.

To ensure the normal service life of the battery, according to some embodiments, the battery can be heated under low temperature condition, which is to say, when the heating condition is met, the heating circuit is controlled to start heating for the battery; when the heating stop condition is met, the heating circuit is controlled to stop heating, according to certain embodiments.

In the actual application of battery, the battery heating condition and heating stop condition can be set according to the actual ambient conditions, to ensure normal charge/discharge performance of the battery, according to some embodiments.

To heat up a battery E in low temperature environment, one embodiment of the present invention provides a heating circuit for battery E; as shown in FIG. 1, the battery heating circuit comprising a first switch unit 11, a second switch unit 12, a third switch unit 13, a fourth switch unit 14, a switching control module 100, a damping component R1, a current storage component L1, and a charge storage component C1; the damping component R1 and current storage component L1 are configured to connect with the battery in series to form a branch; the first switch unit 11 and second switch unit 12 are connected in series with each other and then connected in parallel with the branch; the third switch unit 13 and fourth switch unit 14 are connected in series with each other and then connected in parallel with the branch; the charge storage component C1 is connected in series between the junction point of the first switch unit 11 and second switch unit 11 and the junction point of the third switch unit 13 and fourth switch unit 14, so that the first switch unit 11, charge storage component C1, and third switch unit 13 form a first branch configured to transfer energy from the battery to the charge storage component C1 and a second branch configured to transfer energy from the charge storage component C1 to the battery, and the fourth switch unit 14, charge storage component C1, and second switch unit 12 form a third branch configured to transfer energy from the battery to the charge storage component C1 and a fourth branch configured to transfer energy from the charge storage component C1 to the battery; the switching control module 100 is connected with the first switch unit 11, second switch unit 12, third switch unit 13, and fourth switch unit 14 respectively, and is configured to control ON/OFF of the first switch unit 11, second switch unit 12, third switch unit 13, and fourth switch unit 14, so as to control the energy flow between the battery and the charge storage component C1.

In the technical scheme of certain embodiments of the present invention, when the heating condition is met, the switching control module 100 controls the first switch unit 11 and third switch unit 13 to switch on, and thus the battery E and the charge storage component C1 are connected in series via the first switch unit 11 and third switch unit 13 to form a loop, and the battery E can discharge through the said loop, i.e., charge the charge storage component C1; when the current flow through the charge storage component C1 in the loop reaches zero after the peak current, the charge storage component C1 begins to discharge through the loop, i.e., charge the battery E; in the charge/discharge process of the battery E, the current in the loop can flow through the damping component R1 in forward direction and reverse direction, and thus the damping component R1 generates heat, so that the purpose of heating up the battery E is attained.

The switching control module 100 can be used to control the first switch unit 11 and third switch unit 13 to switch off when or after the current flow through the charge storage component C1 reaches zero after a current flow cycle, after the first switch unit 11 and the third switch unit 13 switch on. Preferably, the switching control module 100 is configured to control the first switch unit 11 and third switch unit 13 to switch off when the current flow through the charge storage component C1 reaches zero after a current flow cycle after the first switch unit 11 and third switch unit 13 switch on; by switching off the first switch unit 11 and third switch unit 13 at that time when the current reaches zero, the disturbance to the entire circuit can be minimized.

In order to improve the heating efficiency of the heating circuit, in the technical scheme of certain embodiments of the present invention, the switching control module 100 can control the second switch unit 12 and fourth switch unit 14 to switch on after the first switch unit 11 and third switch unit 13 switch off; thus, the battery E and charge storage component C1 are connected in series via the second switch unit 12 and fourth switch unit 14 and form another loop, and the battery E can discharge through the said another loop, i.e., charge the charge storage component C1 in the direction reverse to the previous direction; when the current flow through the charge storage component C1 in the said another loop reaches zero after the peak current, the charge storage component C1 begins to discharge through the said another loop, i.e., charges the battery E; in the charge/discharge process of the battery E, the current in the said another loop flows through the damping component R1 in forward direction and reverse direction, and thus the damping component R1 generates heat, so that the purpose of heating up the battery E is attained.

The switching control module 100 can be used to control the second switch unit 12 and fourth switch unit 14 to switch off when or after the current flow through the charge storage component C1 reaches zero after the second switch unit 12 and fourth switch unit 14 switch on. Preferably, the switching control module 100 is configured to control the second switch unit 12 and fourth switch unit 14 to switch off when the current flow through the charge storage component C1 reaches zero after a current flow cycle after the second switch unit 12 and fourth switch unit 14 switch on; by switching off the second switch unit 12 and fourth switch unit 14 at that time when the current reaches zero, the disturbance to the entire circuit can be minimized.

By inverting the voltage polarity of the charge storage component C1, the heating circuit for battery E provided in certain embodiments of the present invention achieves heating of the battery E in the charge/discharge cycles; higher heating efficiency, simple structure, and small system footprint could be achieved.

Thus, when the battery need to be heated, the switching control module 100 controls the first switch unit 11, second switch unit 12, third switch unit 13, and fourth switch unit 14 to switch on or off, so as to control the energy flowing between the battery E and the charge storage component C1, to attain the purpose of heating up the battery E; when heating is not needed any more, the switching control module 100 controls the switch unit 11, second switch unit 12, third switch unit 13, and fourth switch unit 14 to switch off, so as to stop the heating of the battery E. The switching control module 100 controls the first switch unit 11 and third switch unit 13, as well as the second switch unit 12 and fourth switch unit 14 to switch on and off in alternate at an appropriate time interval, which can be set as needed according to the actual demand for operation. For example, the switching control module 100 can control the first switch unit 11 and third switch unit 13 to switch off for a first preset time interval, then control the second switch unit 12 and fourth switch unit 14 to switch on; or, the switching control module 100 can control the second switch unit 12 and fourth switch unit 14 to switch off for a second preset time interval, then control the first switch unit 11 and third switch unit 13 to switch on; the first preset time interval and the second preset time interval can be zero (i.e., when a group of switch units are controlled to switch off, the other group of switch units are controlled to switch on at the same time), and can be equal to each other or not equal to each other. Certain embodiments of the present invention do not impose any limitation to those time intervals.

To keep the energy flowing back-and-forth between the battery E and the charge storage component C1, the first switch unit 11, charge storage component C1, and third switch unit 13 form a first branch configured to transfer energy from the battery E to the charge storage component C1 and a second branch configured to transfer energy from the charge storage component C1 to the battery E; the fourth switch unit 14, charge storage component C1, and second switch unit 12 foam a third branch configured to transfer energy from the battery E to the charge storage component C1 and a fourth branch configured to transfer energy from the charge storage component C1 to the battery E; the switching control module 100 is configured to control ON/OFF of the first branch and second branch by controlling ON/OFF of the first switch unit 11 and third switch unit 13, and control ON/OFF of the third branch and fourth branch by controlling ON/OFF of the second switch unit 12 and fourth switch unit 14.

In one embodiment of the present invention, the first switch unit 11, second switch unit 12, third switch unit 13, and fourth switch unit 14 are two-way switches. Thus, the energy can be controlled to flow between the battery E and the charge storage component C1 by controlling ON/OFF of the first switch unit 11, second switch unit 12, third switch unit 13, and fourth switch unit 14.

If the first switch unit 11, second switch unit 12, third switch unit 13, and fourth switch unit 14 are composed only by two-way switches, the circuit is simple, and the system has smaller footprint and is easy to implement; however, to achieve energy flow cut-off in forward direction and reverse direction, the following embodiment of first switch unit 11, a second switch unit 12, a third switch unit 13, and a fourth switch unit 14 is provided further in the present invention.

Preferably, at least one of the first switch unit 11, second switch unit 12, third switch unit 13, and fourth switch unit 14 is composed of two one-way switches connected in parallel opposite to each other. Thus, energy flow cut-off in forward direction and reverse direction can be achieved by controlling the two one-way switches connected in parallel opposite to each other with the switching control module 100. Those skilled in the art should understand that the one-way switches can be implemented in a variety of ways. Certain embodiments of the present invention do not impose any limitation to the specific implementation of the one-way switches; for example, the one-way switches can be implemented directly with one-way switches, or can be implemented with switches and one-way semiconductor components connected in series to each other, respectively. Hereafter one embodiment in which the one-way switches are composed of switches and one-way semiconductor components connected in series respectively will be detailed.

Figure 2:
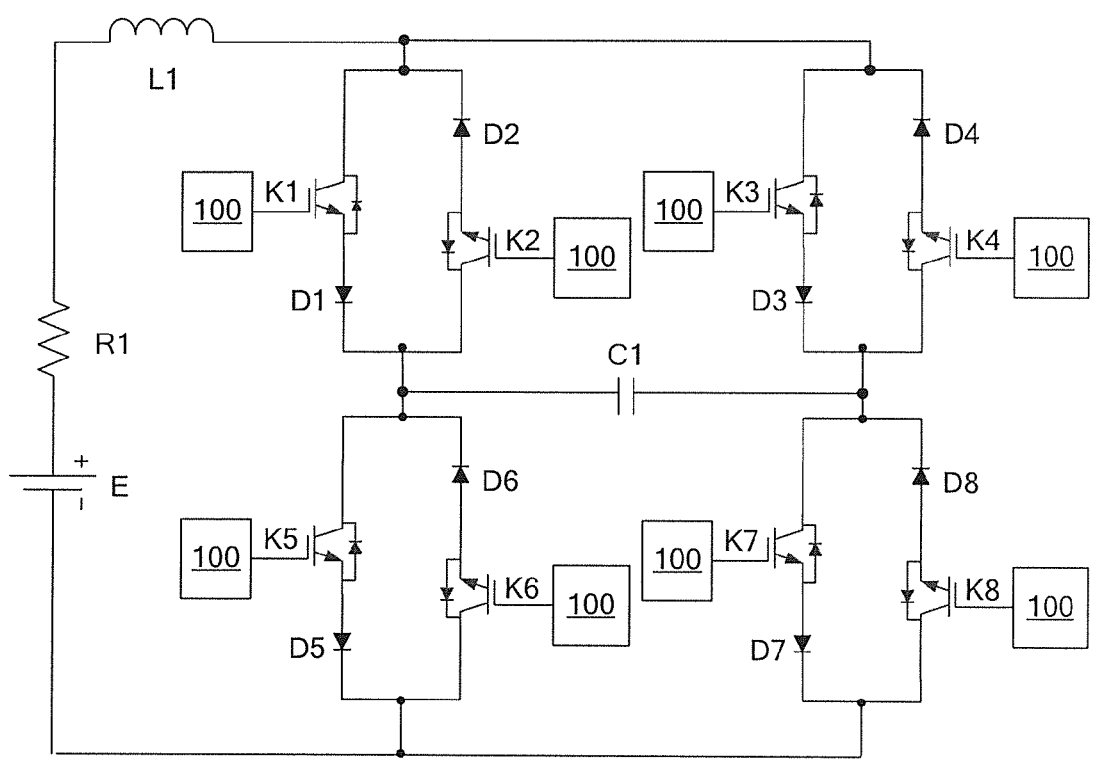
FIG. 2 is a schematic diagram showing a battery heating circuit according to another embodiment of the present invention.

In one embodiment, as shown in FIG. 2, the first switch unit 11 comprises a switch K1, a switch K2, a one-way semiconductor component D1, and a one-way semiconductor component D2; the third switch unit 13 comprises a switch K7, a switch K8, a one-way semiconductor component D7, and a one-way semiconductor component D8; the switch K1, one-way semiconductor component D1, charge storage component C1, switch K7, and one-way semiconductor component D7 are connected in series to form the first branch; the switch K2, one-way semiconductor component D2, charge storage component C1, switch K8, and one-way semiconductor component D8 are connected in series to form the second branch; the switching control module 100 is connected with the switch K1, switch K2, switch K7, and switch K8, and is configured to control ON/OFF of the first branch and second branch by controlling ON/OFF of the switch K1, switch K2, switch K7, and switch K8.

The fourth switch unit 14 comprises a switch K3, a switch K4, a one-way semiconductor component D3, and a one-way semiconductor component D4; the second switch unit 12 comprises a switch K5, a switch K6, a one-way semiconductor component D5, and a one-way semiconductor component D6; the switch K3, one-way semiconductor component D3, charge storage component C1, switch K5, and one-way semiconductor component D5 are connected in series to form the third branch; the switch K4, one-way semiconductor component D4, charge storage component C1, switch K6, and one-way semiconductor component D6 are connected in series to form the fourth branch; the switching control module 100 is connected with the switch K3, switch K4, switch K5, and switch K6, and is configured to control ON/OFF of the third branch and fourth branch by controlling ON/OFF of the switch K3, switch K4, switch K5, and switch K6.

In another embodiment, at least one of the first switch unit 11, second switch unit 12, third switch unit 13, and fourth switch unit 14 is composed of two two-way switches connected in series opposite to each other. Thus, energy flow cut-off in forward direction and reverse direction can be achieved by controlling the two two-way switches connected in series opposite to each other with the switching control module 100. Hereafter the embodiment will be detailed.

Figure 3:
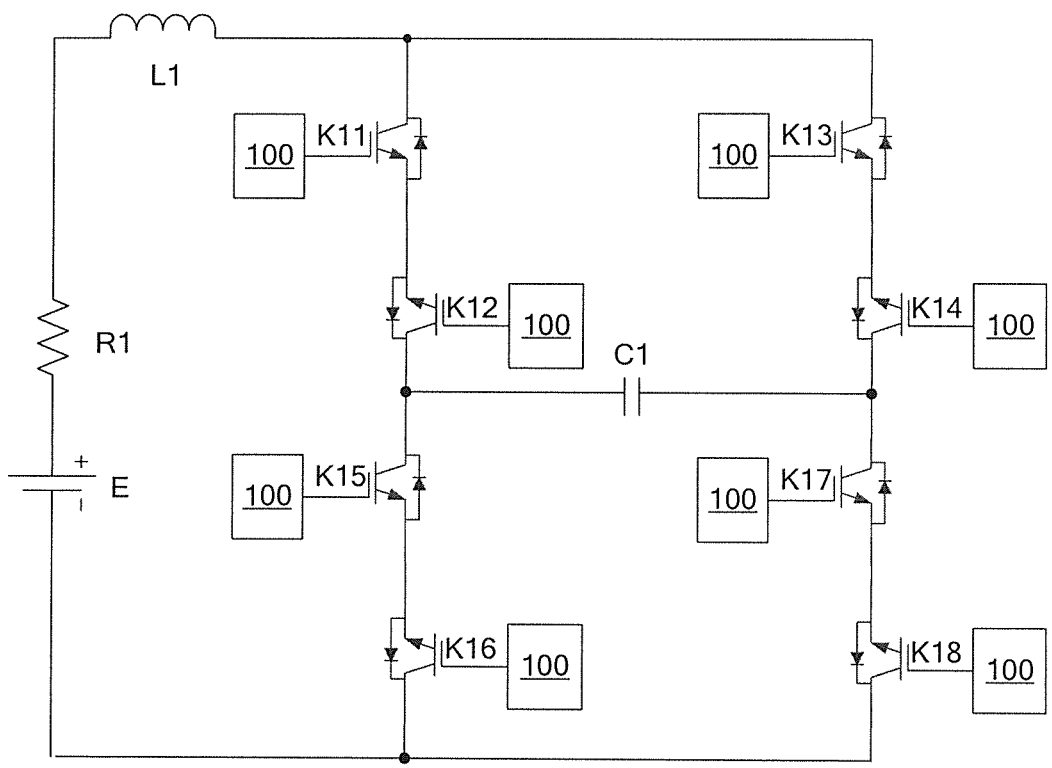
FIG. 3 is a schematic diagram showing a battery heating circuit according to yet another embodiment of the present invention.

As shown in FIG. 3, the first switch unit 11 comprises a two-way switch K11 and a two-way switch K12 connected in series opposite to each other; the third switch unit 13 comprises a two-way switch K17 and a two-way switch K18 connected in series opposite to each other; the two-way switch K11, two-way switch K12, charge storage component C1, two-way switch K17, and two-way switch K18 are connected in series to form the first branch and the second branch; the switching control module 100 is connected with the two-way switch K11, two-way switch K12, two-way switch K17, and two-way switch K18, and is configured to control ON/OFF of the first branch and the second branch by controlling ON/OFF of the two-way switch K11, two-way switch K12, two-way switch K17, and two-way switch K18.

The second switch unit 12 comprises a two-way switch K15 and a two-way switch K16 connected in series opposite to each other; the fourth switch unit 14 comprises a two-way switch K13 and two-way switch K14 connected in series opposite to each other; the two-way switch K13, two-way switch K14, charge storage component C1, two-way switch K15, and two-way switch K16 are connected in series to form the third branch and the fourth branch; the switching control module 100 is connected with the two-way switch K15, two-way switch K16, two-way switch K13, and two-way switch K14, and is configured to control ON/OFF of the third branch and the fourth branch by controlling ON/OFF of the two-way switch K15, two-way switch K16, two-way switch K13, and two-way switch K14.

The embodiment of first switch unit 11, second switch unit 12, third switch unit 13, and fourth switch unit 14 described here before enables the control of ON/OFF of the first branch, second branch, third branch, and fourth branch, respectively, so as to achieve energy flow cut-off in forward direction and reverse direction flexibly.

Preferably, the heating circuit further comprises a resistor connected in series with the first branch and/or the second branch, and/or a resistor connected in series with the third branch and/or the fourth branch (not shown). By connecting a resistor in series in the heating loop for battery E, the current flowing through the heating circuit can be decreased, and thereby the battery E can be protected against damages resulted from over-current in the loop.

The switching control module 100 can be a separate controller, which, by using internal program setting, achieves ON/OFF control of different external switches; or, the switching control module 100 may comprise a plurality of controllers, for example, a switching control module 100 can be set for each of the first switch unit 11, the second switch unit 12, the third switch unit 13, and the fourth switch unit 14; or, the plurality of switching control modules 100 can be integrated into an assembly. Certain embodiments of the present invention do not impose any limitation to the form of implementation of the switching control module 100.

Hereafter the working process of some embodiments of the heating circuit for battery E will be described briefly with reference to FIG. 2-4. It should be noted that though the features and components of certain embodiments of the present invention are described specifically with reference to FIG. 2-4, each feature or component can be used separately without other features and components, or can be used in combination or not in combination with other features and components. The embodiments of the heating circuit for battery E provided in the present invention are not limited to those as shown in FIGS. 2-4.

Figure 4:
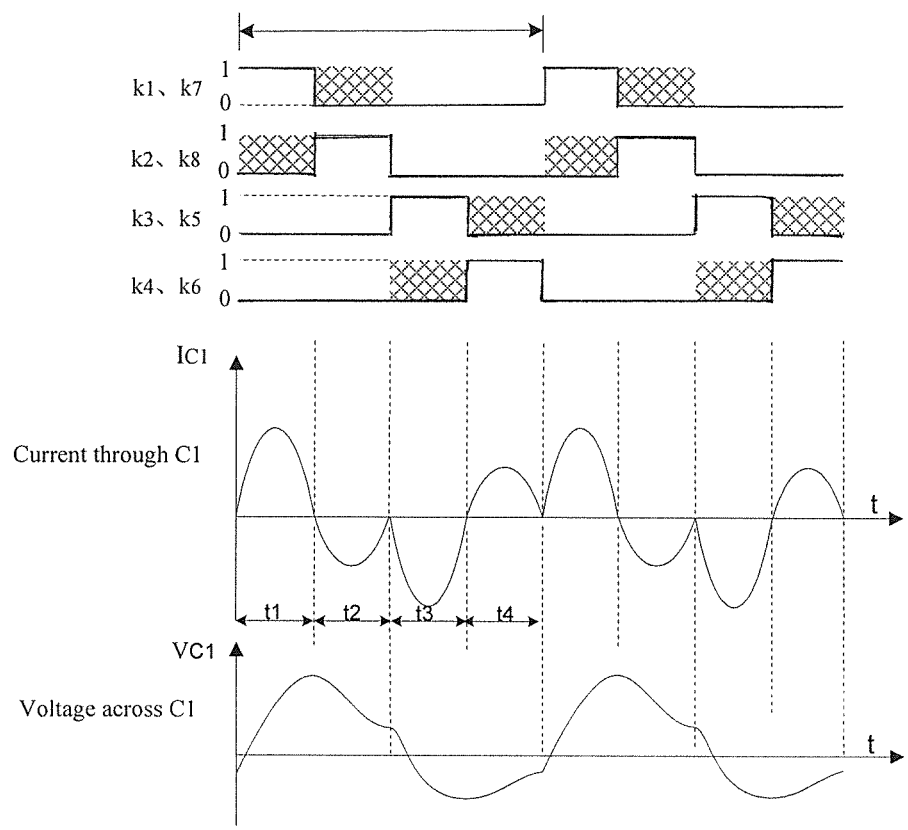
FIG. 4 is a timing diagram of waveforms of the battery heating circuit as shown in FIG. 2 according to one embodiment of the present invention.

In the heating circuit for battery E as shown in FIG. 2, for example, the switch K1, the switch K2, the one-way semiconductor component D1, and the one-way semiconductor component D2 form the first switch unit 11; the switch K5, the switch K6, the one-way semiconductor component D5, and the one-way semiconductor component D6 form the second switch unit 12; the switch K7, the switch K8, the one-way semiconductor component D7, and the one-way semiconductor component D8 form the third switch unit 13; the switch K3, the switch K4, the one-way semiconductor component D3, and the one-way semiconductor component D4 form the fourth switch unit 14; the damping component R1 and the current storage component L1 are connected with the battery E in series to form a branch; the switching control module 100 can control ON/OFF of the switches K1-K8. In another example, FIG. 4 is a timing sequence diagram of waveforms corresponding to the heating circuit as shown in FIG. 2, wherein: $V_{C1}$ refers to the voltage value across the charge storage component C1, and $I_{C1}$ refers to the value of current through the charge storage component C1. In yet another example, the working process of the heating circuit as shown in FIG. 2 is as follows:

a) When the battery E needs to be heated, the switching control module 100 controls the switches K1 and K7 to switch on, and thus the battery E is discharged through the loop composed of the switch K1, the one-way semiconductor component D1, the charge storage component C1, the switch K7, and the one-way semiconductor component D7, as indicated by the time duration $t_1$ in FIG. 4;

b) The switching control module 100 controls the switches K1 and K7 to switch off and controls the switches K2 and K8 to switch on at the same time when the current flowing through the charge storage component C1 reaches zero after the peak current; thus, the battery E is charged through the loop composed of the charge storage component C1, the switch K2, the one-way semiconductor component D2, the switch K8, and the one-way semiconductor component D8, as indicated by the time duration $t_2$ in FIG. 4;

c) The switching control module 100 controls the switches K2 and K8 to switch off and controls the switches K3 and K5 to switch on at the same time when the current flowing through the charge storage component C1 reaches zero after the peak current; thus, the battery E is discharged through the loop composed of the switch K3, the one-way semiconductor component D3, the charge storage component C1, the switch K5, and the one-way semiconductor component D5, as indicated by the time duration $t_3$ in FIG. 4;

d) The switching control module 100 controls the switches K3 and K5 to switch off and controls the switches K4 and K6 to switch on at the same time when the current flowing through the charge storage component C1 reaches zero after the peak current; thus, the battery E is charged through the loop composed of the charge storage component C1, the switch K4, the one-way semiconductor component D4, the switch K6, and the one-way semiconductor component D6, as indicated by the time duration t4 in FIG. 4; the switching control module 100 controls the switches K4 and K6 to switch off when the current flowing through the charge storage component C1 reaches zero after the peak current;

e) The steps a) to d) are repeated; thus, the battery E is heated up continuously in the charge/discharge cycles, till the battery E meets the heating stop condition.

Figure 5:
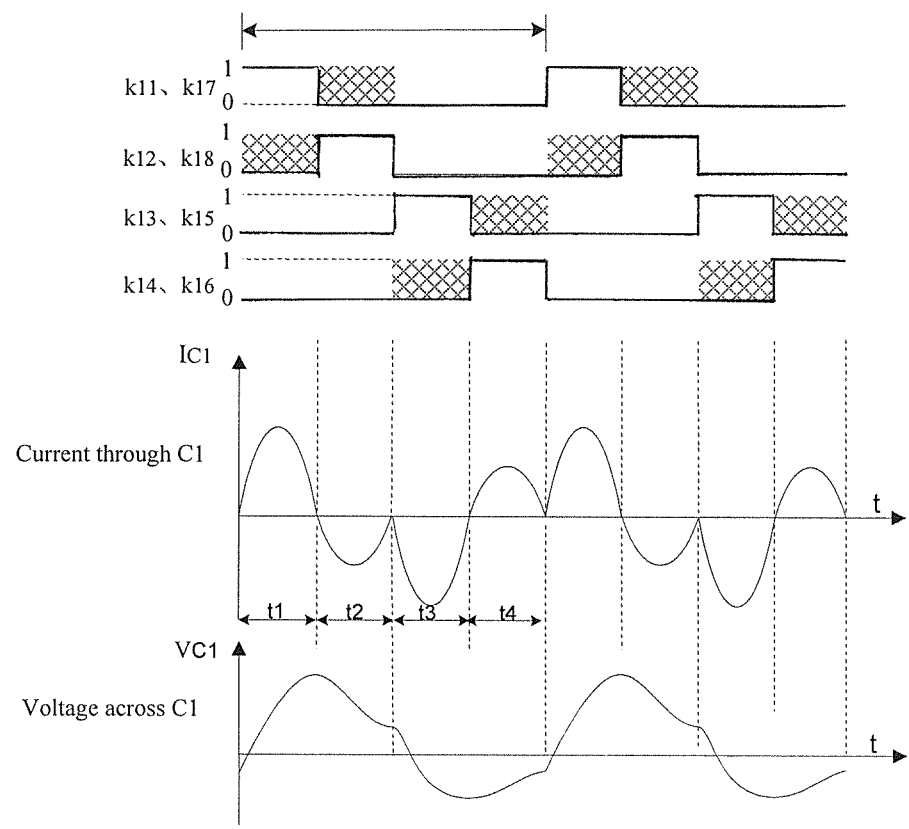
FIG. 5 is a timing diagram of waveforms of the battery heating circuit as shown in FIG. 3 according to one embodiment of the present invention.

In the heating circuit for battery E as shown in FIG. 3, for example, the switches K11 and K12 constitute the first switch unit 11, the switches K15 and K16 constitute the second switch unit 12, the switches K17 and K18 constitute the third switch unit 13, and the switches K13 and K14 constitute the fourth switch unit 14; the damping component R1 and the current storage component L1 are connected with the battery E in series to form a branch; the switching control module 100 can control ON/OFF of the switches K11, K12, K13, K14, K15, K16, K17, and K18. In another example, FIG. 5 is a timing sequence diagram of waveforms corresponding to the heating circuit as shown in FIG. 3, wherein: $V_{C1}$ refers to the voltage value across the charge storage component C1, and $I_{C1}$ refers to the value of current through the charge storage component C1. In yet another example, the working process of the heating circuit as shown in FIG. 5 is as follows:

a) When the battery E needs to be heated, the switching control module 100 controls the switches K11 and K17 to switch on, and thus the battery E is discharged through the loop composed of at least the switch K11, the charge storage component C1, and the switch K17, as indicated by the time duration $t_1$ in FIG. 5;

b) The switching control module 100 controls the switches K11 and K17 to switch off and controls the switches K12 and K18 to switch on at the same time when the current flowing through the charge storage component C1 reaches zero after the peak current; thus, the battery E is charged through the loop composed of at least the charge storage component C1, the switch K12, and the switch K18, as indicated by the time duration $t_2$ in FIG. 5;

c) The switching control module 100 controls the switches K12 and K18 to switch off and controls the switches K13 and K15 to switch on at the same time when the current flowing through the charge storage component C1 reaches zero after the peak current; thus, the battery E is discharged through the loop composed of at least the switch K13, the charge storage component C1, and the switch K15, as indicated by the time duration $t_3$ in FIG. 5;

d) The switching control module 100 controls the switches K13 and K15 to switch off and controls the switches K14 and K16 to switch on at the same time when the current flowing through the charge storage component C1 reaches zero after the peak current; thus, the battery E is charged through the loop composed of at least the charge storage component C1, the switch K14, and the switch K16; the switching control module 100 controls the switches K14 and K16 to switch off when the current flowing through the charge storage component C1 reaches zero after the peak current;

e) The steps a) to d) are repeated; thus, the battery E is heated up continuously in the charge/discharge cycles, till the battery E meets the heating stop condition.

According to certain embodiments, a battery heating circuit is provided, comprising a first switch unit 11, a second switch unit 12, a third switch unit 13, a fourth switch unit 14, a switching control module 100, a damping component R1, a current storage component L1, and a charge storage component C1; the damping component R1 and the current storage component L1 are configured to connect with the battery in series to form a branch; the first switch unit 11 and the second switch unit 12 are connected in series with each other and then connected in parallel with the branch; the third switch unit 13 and the fourth switch unit 14 are connected in series with each other and then connected in parallel with the branch; the charge storage component C1 is connected in series between the junction point of the first switch unit 11 and the second switch unit 12 and the junction point of the third switch unit 13 and the fourth switch unit 14, so that the first switch unit 11, the charge storage component C1, and the third switch unit 13 form a first branch configured to transfer energy from the battery to the charge storage component C1 and a second branch configured to transfer energy from the charge storage component C1 to the battery, and the fourth switch unit 14, the charge storage component C1, and the second switch unit 12 form a third branch configured to transfer energy from the battery to the charge storage component C1 and a fourth branch configured to transfer energy from the charge storage component C1 to the battery; the switching control module 100 is connected with the first switch unit 11, the second switch unit 12, the third switch unit 13, and the fourth switch unit 14 respectively, and is configured to control ON/OFF of the first switch unit 11, the second switch unit 12, the third switch unit 13, and the fourth switch unit 14, so as to control the energy flow between the battery and the charge storage component C1.

The heating circuit provided in certain embodiments of the present invention can improve the charge/discharge performance of the battery E; in addition, safety problem caused by short circuit can be avoided when the battery E is heated due to the existence of the charge storage component C1 connected in series, and therefore the battery E can be protected effectively according to some embodiments.

For example, some or all components of various embodiments of the present invention each are, individually and/or in combination with at least another component, implemented using one or more software components, one or more hardware components, and/or one or more combinations of software and hardware components. In another example, some or all components of various embodiments of the present invention each are, individually and/or in combination with at least another component, implemented in one or more circuits, such as one or more analog circuits and/or one or more digital circuits.

While some embodiments of the present invention are described above with reference to the accompanying drawings, the present invention is not limited to the details of those embodiments. Those skilled in the art can make modifications and variations, without departing from the spirit of the present invention. However, all these modifications and variations shall be deemed as falling into the scope of the present invention.

In addition, it should be noted that the specific technical features described in the above embodiments can be combined in any appropriate way, provided that there is no conflict. To avoid unnecessary repetition, certain possible combinations are not described specifically. Moreover, the different embodiments of the present invention can be combined as needed, as long as the combinations do not deviate from the spirit of the present invention. However, such combinations shall also be deemed as falling into the scope of the present invention.

Hence, although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A circuit for heating a battery, the circuit comprising:
the battery including a first damping component and a first current storage component, the first damping component and the first current storage component being parasitic to the battery;
a first switch unit including a first terminal and a second terminal;
a second switch unit including a third terminal and a fourth terminal, the third terminal being connected to the second terminal;
a third switch unit including a fifth terminal and a sixth terminal, the fifth terminal being connected to the first terminal;
a fourth switch unit including a seventh terminal and an eighth terminal, the seventh terminal being connected to the sixth terminal, the eighth terminal being connected to the fourth terminal;
a switching control component coupled to the first switch unit, the second switch unit, the third switch unit, and the fourth switch unit; and
a charge storage component connected to the second terminal, the third terminal, the sixth terminal and the seventh terminal;
wherein:
the first damping component and the first current storage component are connected with a combination of the first switch unit, the second switch unit, the third switch unit, the fourth switch unit, and the charge storage component;
the switching control component is configured to turn on and off each of the first switch unit, the second switch unit, the third switch unit, and the fourth switch unit so as to control one or more currents flowing from the battery to the charge storage component and flowing from the charge storage component to the battery;
wherein the circuit for heating the battery is configured to heat the battery by at least discharging and charging the battery.

2. The circuit of claim 1, wherein the switching control component is further configured to turn on and off each of the first switch unit and the fourth switch unit so as to control the one or more currents flowing through at least the first switch unit and the fourth switch unit.

3. The circuit of claim 2, wherein the switching control component is further configured to turn off the first switch unit and the fourth switch unit when or after the one or more currents flowing through at least the first switch unit and the fourth switch unit reduce to zero in magnitude after the first switch unit and the fourth switch unit are turned on.

4. The circuit of claim 1, wherein the switching control component is further configured to turn on and off each of the second switch unit and the third switch unit so as to control the one or more currents flowing through at least the second switch unit and the third switch unit.

5. The circuit of claim 4, wherein the switching control component is further configured to turn off the second switch unit and the third switch unit when or after the one or more currents flowing through at least the second switch unit and the third switch unit reduce to zero in magnitude after the second switch unit and the third switch unit are turned on.

6. The circuit of claim 1 wherein each of the first switch unit, the second switch unit, the third switch unit, and the fourth switch unit includes a two-way switch.

7. The circuit of claim 1 wherein each of the first switch unit, the second switch unit, the third switch unit, and the fourth switch unit includes two one-way switches connected in parallel to each other.

8. The circuit of claim 1 wherein each of the first switch unit, the second switch unit, the third switch unit, and the fourth switch unit includes two two-way switches connected in series with each other.

9. The circuit of claim 1, and further comprising a resistor connected in series with the first switch unit and the fourth switch unit.

10. The circuit of claim 1, and further comprising a resistor connected in series with the second switch unit and the third switch unit.

11. The circuit of claim 1 is further configured to:
start heating the battery if at least one heating start condition is satisfied; and
stop heating the battery if at least one heating stop condition is satisfied.

12. A circuit for heating a battery, the circuit comprising:
the battery including a first damping component and a first current storage component, the first damping component and the first current storage component being parasitic to the battery;
a first switch unit including a first terminal and a second terminal;
a second switch unit including a third terminal and a fourth terminal, the third terminal being connected to the second terminal;
a third switch unit including a fifth terminal and a sixth terminal, the fifth terminal being connected to the first terminal;
a fourth switch unit including a seventh terminal and an eighth terminal, the seventh terminal being connected to the sixth terminal, the eighth terminal being connected to the fourth terminal;
a switching control component coupled to the first switch unit, the second switch unit, the third switch unit, and the fourth switch unit; and
a charge storage component connected to the second terminal, the third terminal, the sixth terminal and the seventh terminal:,
wherein:
the first damping component and the first current storage component are connected in series with a combination of the first switch unit, the second switch unit, the third switch unit, the fourth switch unit, and the charge storage component;

the switching control component is configured to turn on and off each of the first switch unit, the second switch unit, the third switch unit, and the fourth switch unit so as to control one or more currents flowing from the battery to the charge storage component and flowing from the charge storage component to the battery;

wherein the circuit for heating the battery is configured to heat the battery by at least discharging and charging the battery, wherein:

the first damping component is a parasitic resistor of the battery; and the first current storage component is a parasitic inductor of the battery.

13. The circuit of claim 12 wherein the first charge storage component is a capacitor.

* * * * *